(No Model.) 2 Sheets—Sheet 1.
F. F. & W. S. MEYER.
TROLLEY WIRE FINDER.
No. 530,954. Patented Dec. 18, 1894.
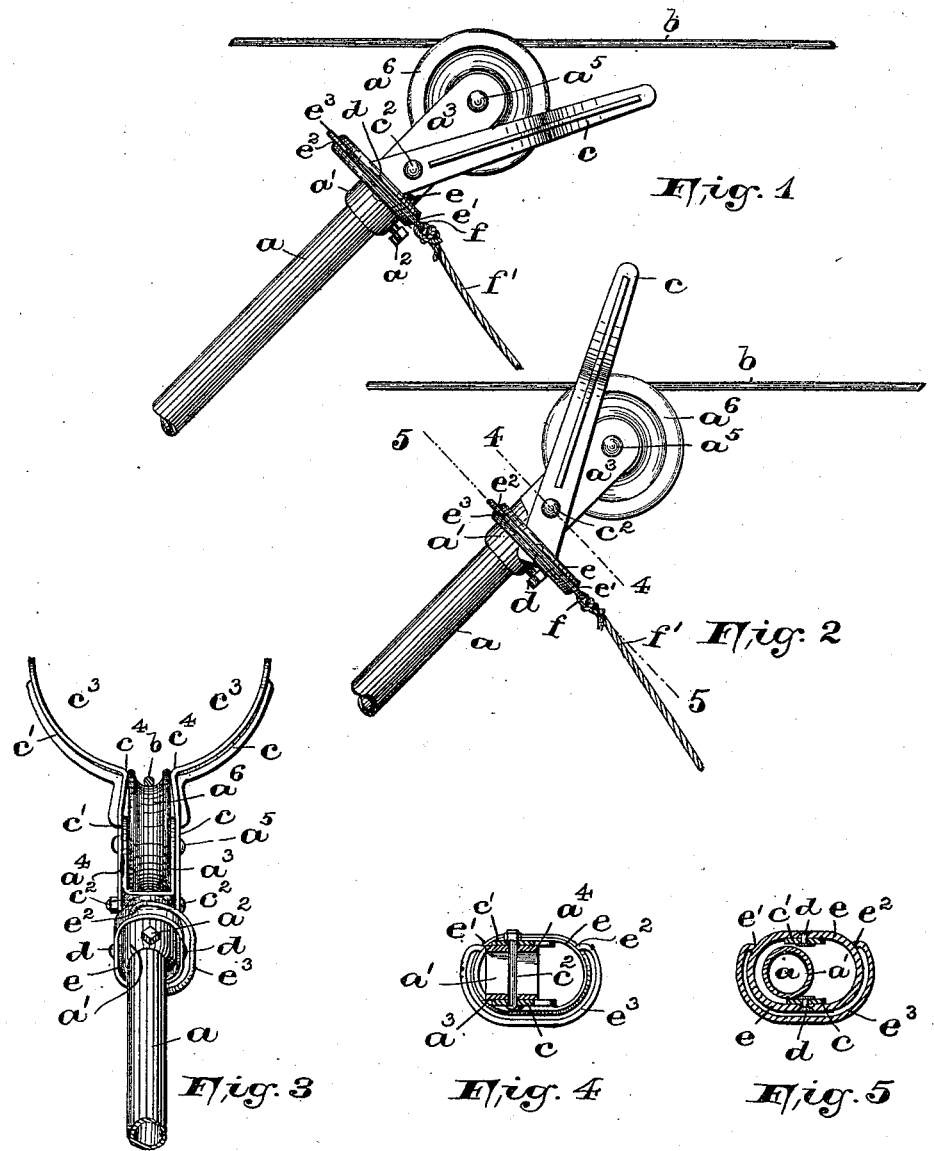
WITNESSES:
Wm. H. Caufield, Jr.
Walter G. E. Ward
INVENTORS:
Frederick F. Meyer
and
William S. Meyer,
BY Fred C. Fraentzel, ATT'Y.

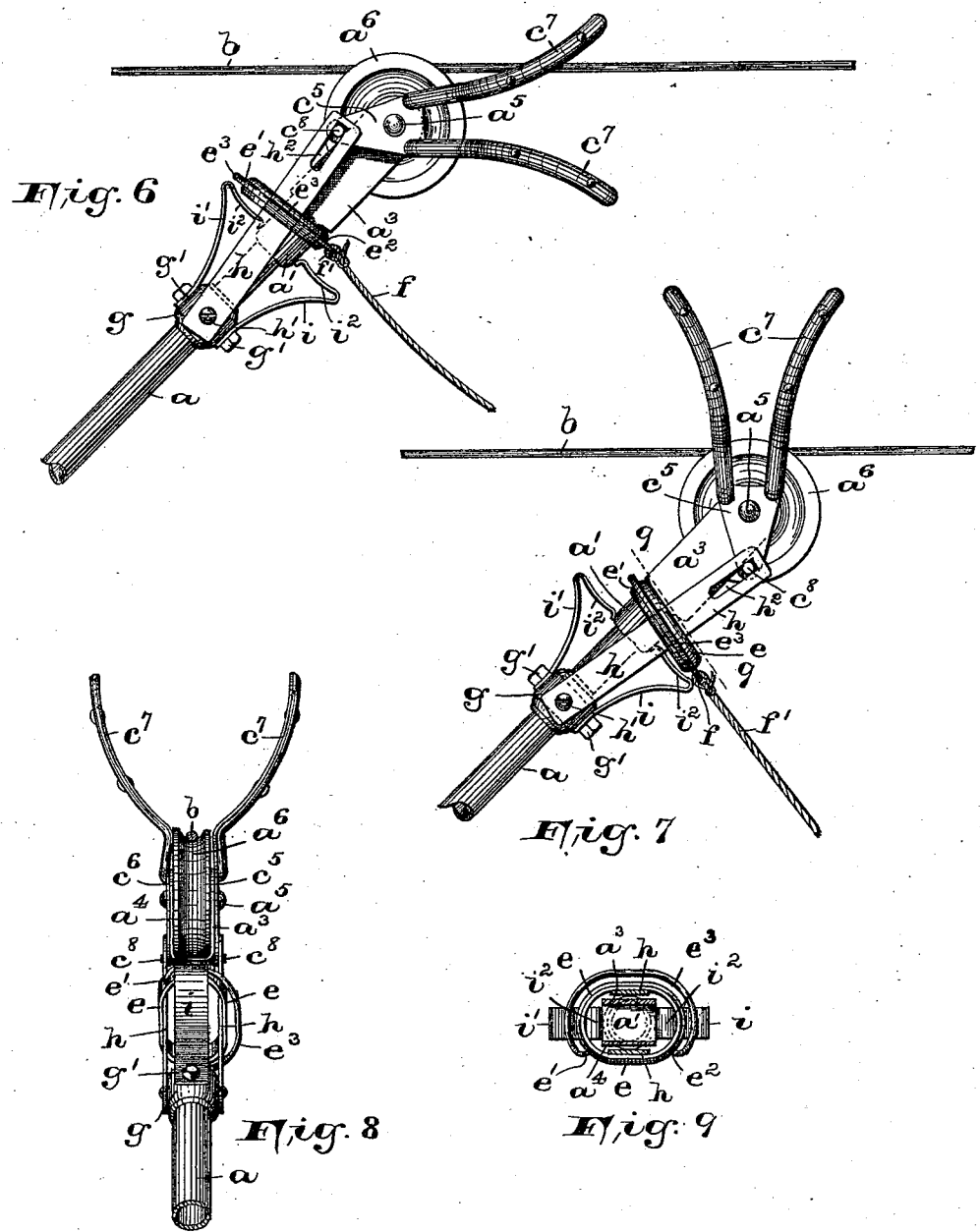

UNITED STATES PATENT OFFICE.

FREDERICK F. MEYER AND WILLIAM S. MEYER, OF NEWARK, NEW JERSEY.

TROLLEY-WIRE FINDER.

SPECIFICATION forming part of Letters Patent No. 530,954, dated December 18, 1894.

Application filed March 14, 1894. Serial No. 503,550. (No model.)

*To all whom it may concern:*

Be it known that we, FREDERICK F. MEYER and WILLIAM S. MEYER, citizens of the United States, residing at Newark, in the county of Essex and State of New Jersey, have invented certain new and useful Improvements in Trolley Devices; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention has reference to improvements in trolleys for electric railway cars, and has for its main object to provide an appliance, which may be termed a "trolley-wheel finder," adapted to be used in connection with the trolley pole and wheel, forming a revoluble guard provided with guide-arms, which may be brought above the highest peripheral point of the trolley wheel, whereby the conductor can quickly replace the wheel in contact with the trolley wire without straining himself or losing time in so replacing the same.

The invention therefore consists of the novel form of trolley device herein set forth, and further, the invention consists in certain novel arrangements and combinations of parts, such as will be hereinafter more fully set forth and finally embodied in the clauses of the claims.

The invention is illustrated in the accompanying sheets of drawings, in which—

Figure 1 is a side view of the trolley embodying the principles of our invention, illustrating the trolley wheel in contact with the trolley wire, and the "trolley-wheel finder" in its normal and inoperative position. Fig. 2 is a similar view of the trolley, showing the "trolley-wheel finder," in its operated position; and Fig. 3 is an end view of the same. Fig. 4 is a cross-section taken on line 4—4 in Fig. 2, and Fig. 5 is a like section on line 5—5 in said Fig. 2. Figs. 6, 7 and 8 are views similar to Figs. 1, 2 and 3 respectively, of a "trolley-wheel finder" of a slightly modified form of construction, but still embodying the principles of our invention, and Fig. 9 is a cross-section taken on line 9—9 in Fig. 7.

Similar letters of reference are employed in each of the above described views to indicate corresponding parts.

It is a well-known fact, that when the position of the trolley pole is reversed at the end of the route, or, when it becomes necessary to replace the trolley wheel onto the wire, when the trolley wheel has been displaced for some other reason, that often a delay is caused by the conductor endeavoring to replace the trolley wheel, or, at other times, when the trolley wheel has jumped the wire, as at switches or turn-outs, the conductor must unnecessarily strain himself to replace the trolley wheel against the wire. To overcome these objectionable features, so common in most of the trolley constructions now in use, we have devised the form of trolley device illustrated in the accompanying drawings and described and claimed in the present specification.

In said drawings, $a$ indicates the trolley pole of an electric railway car, pivotally arranged in the usual manner on the roof of the car. On the free end of said pole is a suitable socket $a'$ which may be screwed upon the threaded end of said pole, or may be secured on said end by means of a set-screw $a^2$, as will be seen more especially from Figs. 1 and 3. Said socket is provided with oppositely arranged fingers $a^3$ and $a^4$, which form a forked hanger, near the upper end of which is secured a pin $a^5$ on which is arranged to rotate thereon, the usual form of trolley wheel $a^6$ adapted to be brought into contact with the trolley wire $b$.

The "trolley wire finder" consists essentially of two or more arms $c\ c'$ pivotally arranged on a pin or bolt $c^2$, as will be seen from Fig. 4, on the opposite sides of said fingers $a^3$ and $a^4$. In the lower ends or portions of said arms $c$ and $c'$ are secured small pivotal pins or rivets $d$, as clearly shown in the several figures of the drawings, which pivotally support a ring $e$, preferably of an elongated form, as will be seen from Figs. 4 and 5; and connected with said ring, at $e'$ and $e^2$, is a wire-like portion forming a loop $e^3$ for the ring $f$ of the pull rope $f'$ connected with the trolley.

The operation of the device will be clearly understood from an inspection of Figs. 1 and 2. When the trolley-wheel has become displaced from contact with the trolley wire $b$, a pull by the conductor on said rope $f'$ causes the ring $e$ to swing on its pivotal pins $d$, which at once causes the arms or finders $c$ and $c'$ to partially rotate on the pin or bolt $c^2$. Said arms $c$ and $c'$ are thus brought from their inoperative position, shown in Fig. 1, to the position illustrated in Fig. 2, said arms being brought far above the highest peripheral point of the trolley wheel $a^6$. Said arms $c$ and $c'$ are preferably curved at the top, as at $c^3$, see Fig. 3, thereby forming a suitable fork which embraces the trolley wire on its opposite sides and finally guide said wire over the peripheral edge of the wheel into the groove therein to establish electrical contact. As will be seen from Fig. 3, said arms $c$ and $c'$ are bent, as at $c^4$, bringing said points into close proximity to the sides of the trolley wheel, to prevent the trolley wire from passing between either side of the wheel $a^6$ and the inner side of either of said arms $c$ and $c'$. Said arms are therefore constructed to safely guide the wire $b$ into the peripheral groove of the trolley wheel, as will be evident. In lieu of the construction and the arrangement of the several parts comprising the "trolley wheel finder," illustrated in said Figs. 1 and 2, et seq., we may use finder arms $c^5$ and $c^6$, as illustrated more especially in Figs. 6, 7, 8 and 9. Said arms $c^5$ and $c^6$ are pivotally arranged on the opposite sides of the fingers $a^3$ and $a^4$, being pivoted on the pin $a^5$. Said arms are also provided with suitable fingers $c^7$, preferably of the shape shown in Fig. 8, which may be made separate from the main part of said arms $c^5$ and $c^6$, being secured thereto in any well-known manner, or they may be formed integral therewith, as will be evident. The lower ends of said arms $c^5$ and $c^6$ are each provided with a small pin $c^8$ projecting out therefrom, substantially as shown.

Adjustably arranged on the trolley pole $a$, by means of set-screws $g'$, or it may be firmly secured to said pole by bolts or screws, is a suitable collar $g$. Pivotally connected with said collar by means of screws or pins $h'$ on opposite sides of said collar $g$ are what we term reversible slide bars $h$ provided at or near their upper ends with slots or openings $h^2$ into which said pins $c^8$ project and are adapted to slide therein, as will be clearly understood from Figs. 6 and 7. In this construction the ring $e$ provided with the loop $e^3$ is directly secured to said oppositely arranged bars $h$, said ring and its loop being of a similar construction as that illustrated in Figs. 4 and 5.

The operation of the several parts is similar to that described in connection with the construction illustrated in Figs. 1, 2 and 3, and will be clearly understood from an inspection of said Figs. 6, 7 and 8.

In order to reverse the position of the trolley pole $a$, the wire-like portion forming the loop $e^3$ extends more than half-way around said ring $e$, whereby the ring $f$ connected with the rope $f'$ can be slipped to either side of said ring $e$, as will be seen from Figs. 4 and 9. The ring or collar $g$ may be provided with suitable fenders $i$ and $i'$, which are flat, as shown, and are preferably made of spring metal. Said fenders are secured to said collar $g$ by means of said screws or bolts $g'$ and are provided with suitably bent portions $i^2$ which set against the sides of said sleeve or socket $a'$, as will be clearly seen from said Figs. 6 and 7. Said fenders $i$ and $i'$ serve as protectors to the ring $e$ and its loop $e^3$ and the other parts of the mechanism to prevent said parts from coming in contact with the cross-wires or supporting wires to the trolley wire $b$, or with the cross arms usually employed for supporting the trolley wire. Said fenders as will be seen from the figures of the drawings, are of such a construction to pass in sliding contact with said cross wires or the cross arms, thereby preventing any parts of the trolley device from being caught and broken.

Of course it will be evident, that the arrangement and construction of the several forms of mechanism herein shown, may be varied without departing from the scope of our invention, and we therefore do not wish to be understood as limiting ourselves to the exact forms and arrangements and combinations of parts herein shown and described. It will also be seen that we may use the single finder arms illustrated in Figs. 1 and 2, or double arms may be used, as shown in Figs. 6 and 7.

Having thus described our invention, what we claim is—

1. In a trolley device, the combination, of the trolley pole and wheel, with a trolley wire finder pivotally connected with the trolley pole, consisting essentially of pivoted finder arms extending laterally back of the trolley wheel, a ring $e$ having a loop $e^3$ connected with said finder arms, and means connected with said ring $e$ and its loop, for bringing the finder arms in position on opposite sides of the trolley wire, substantially as and for the purposes set forth.

2. In a trolley device, the combination, of the trolley pole and wheel, with a trolley wire finder pivotally connected with the trolley pole, consisting essentially of pivoted finder arms extending laterally back of the trolley wheel, a ring $e$ pivotally connected with said finder arms, and having a loop $e^3$, and means connected with said ring $e$ and its loop, for bringing the finder arms in position on opposite sides of the trolley wire, substantially as and for the purposes set forth.

3. The herein described trolley device comprising therein, in combination, a trolley pole, a bifurcated hanger mounted on the end of said pole, a trolley wheel therein, finder arms $c$ and $c'$ pivotally connected with said hanger and extending laterally back of the trolley wheel, a ring $e$ having a loop $e^3$ connected with said finder arms, and means connected with said ring $e$ and its loop, for bringing the finder arms in position on opposite sides of the trolley wire, substantially as and for the purposes set forth.

4. The herein described trolley device comprising therein, in combination, a trolley pole, a socket $a'$ mounted thereon, arms $a^3$ and $a^4$ extending from said socket, a trolley wheel between said arms, arms $c$ and $c'$ pivotally connected with said arms $a^3$ and $a^4$ and extending laterally back of the trolley wheel, a ring $e$ having a loop $e^3$ connected with said arms $c$ and $c'$, and means connected with said ring $e$ and its loop, for bringing said arms into position on opposite sides of the trolley wire, substantially as and for the purposes set forth.

5. In a trolley device, the combination, of the trolley pole and wheel, with a trolley wire finder pivotally connected with the trolley pole, consisting essentially of pivoted finder arms extending laterally back of the trolley wheel, reversible slide bars pivotally mounted on said trolley pole and connected with said finder arms, and means connected with said bars for bringing the finder arms into position on opposite sides of the trolley wire, substantially as and for the purposes set forth.

6. In a trolley device, the combination, of the trolley pole and wheel, with a trolley wire finder pivotally connected with the trolley pole, consisting essentially of pivoted finder arms extending laterally back of the trolley wheel, reversible slide bars pivotally mounted on said trolley pole, having slots or openings $h^2$, pins on said finder arms projecting into said openings, and means connected with said bars for bringing the finder arms into position on opposite sides of the trolley wire, substantially as and for the purposes set forth.

7. The combination of the trolley pole and wheel, with a trolley wire finder mounted on said pole, and fenders $i$ and $i'$ also mounted on said pole, substantially as and for the purposes set forth.

In testimony that we claim the invention set forth above we have hereunto set our hands this 10th day of March, 1894.

FREDERICK F. MEYER.
WILLIAM S. MEYER.

Witnesses:
FREDK. C. FRAENTZEL,
WM. H. CAMFIELD, Jr.